Jan. 14, 1969     E. R. BRANDT ET AL     3,421,425

CAMERA BELLOWS

Original Filed Sept. 10, 1964

INVENTORS
Edison R. Brandt
Frank W. Knight Jr.
Brown and Mikulka
and
BY Charles S. McGuire
ATTORNEYS United States Patent Office 3,421,425
Patented Jan. 14, 1969

3,421,425
CAMERA BELLOWS
Edison R. Brandt, Cohasset, Mass., and Frank W. Knight, Jr., Salem, N.H., assignors to Polaroid Corporation, Cambridge, Mass., a corporation of Delaware
Original application Sept. 10, 1964, Ser. No. 395,402. Divided and this application June 26, 1967, Ser. No. 652,397
U.S. Cl. 95—39           10 Claims
Int. Cl. G03b *17/00*

ABSTRACT OF THE DISCLOSURE

This application relates to photography and more particularly to a novel construction of a camera bellows.

---

This application is a division of application Ser. No. 395,402 filed Sept. 10, 1964.

In many cameras a protected light path is provided between the objective lens and the film plane by an expansible and collapsible bellows. The flexible nature of the bellows permits easy adjustment of the lens relative to the film plane for focusing or other optical purposes. Also, in folding-type cameras the bellows may be collapsed to move the lens to a position in proximity to the camera body, thus providing a much more compact device in the folded position to facilitate handling, transport and storage. The bellows is normally attached at its front and rear ends, respectively, to the lens board or shutter housing and the camera body in lighttight engagement.

Good quality bellows are at present most commonly constructed of multilayer sheets including a black fabric for the interior surface, a paperboard to render the desired stiffness, and an exterior covering of a flexible material such as vinyl. The sheets are cut to the proper shape and folded in zig-zag fashion to produce the familiar, collapsible, pyramid-shaped bellows. The multilayer sheets are more expensive than, for example, most common plastics and since the folding is often done by hand the manufacturing process is quite expensive. The fabrication of camera bellows from materials such as plastics by molding techniques has not been considered practical for a number of reasons which will appear more fully hereinafter. The present invention is concerned with producing a molded bellows which is satisfactory in all functional respects and which may be constructed much more economically than those in present use.

A principal object of the invention is to provide a camera bellows comprising a series of continuous convolutions and having satisfactory opacity, flexibility and folding characteristics.

A further object is to provide a camera bellows comprising a single, continuous sheet of molded thermoplastic material having continuous, planar front and rear surfaces for mating with camera parts to provide a lighttight seal without the use of gaskets.

Another object is to provide a novel camera bellows which is extremely simple and economical in manufacture, rugged and durable in use and refined in appearance.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and object of the invention, reference should be had to the following detailed description taken in connection with the accompanying drawing wherein.

Figure 1:
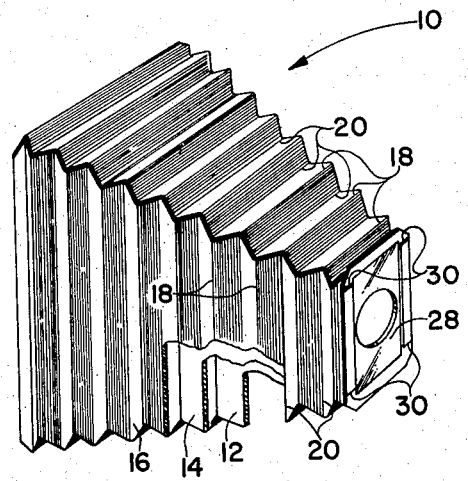
FIGURE 1 is a perspective view of a prior art camera bellows with portions broken away to show the structure of the material.

Referring now to the drawing, in FIGURE 1 is shown a camera bellows 10 constructed according to conventional, presently known methods and of the usual materials, comprising an inner layer 12 of black fabric, a center layer 14 of paper or cardboard and an outer layer 16 of fabric, vinyl or other such material. The material is first cut, according to a pattern, in the proper shape from a flat sheet. The sheet is folded in zig-zag fashion in four sections and then joined along opposite edges to form a tunnel, each of the four sections forming one of the sides. Thus, each section includes succession of alternate "outside folds" 18 and "inside folds" 20. Since the bellows is formed by folding an initially flat, continuous sheet, it is necessary, in order to achieve the desired flatness in the collapsed or folded position, to abut an outside fold on one section or side of the bellows with an inside fold on the two adjoining sections. Each convolution of the bellows is, therefore, made up of two inside and two outside folds.

Figure 2:
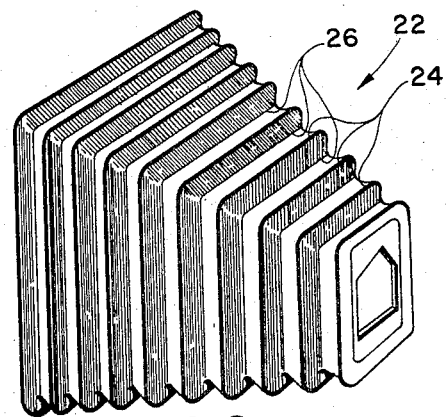
FIG. 2 is a perspective view of a camera bellows constructed according to the present invention.

A preferred embodiment of the bellows of the present invention is shown in FIG. 2 and denoted by the reference numeral 22. The material of bellows 22 may be initially supplied as a continuous sheet, as in bellows 10, but is fabricated by heating and reforming the material, rather than by folding. Bellows 22 also comprises alternate "outside folds" 24 and "inside folds" 26 on each of four sections or sides. However, the inside folds of each section abut inside folds on each of the adjoining sections, and the outside folds abut outside folds, thus forming bellows 22 of a series of continuous convolutions. Such a construction cannot be achieved merely by folding an initially flat sheet, without heating and reforming, unless the corners are folded over, crimped or otherwise distorted.

The term "convolution" is used throughout the present application to denote one complete pattern, longitudinally of the bellows, which is successively repeated to form the complete item. The term "continuous convolution," as indicated above, denotes one complete pattern wherein a permanent crease or fold is formed in the material and runs continuously around the bellows with the material on one side of the fold remaining at the same angle with respect to the material on the other side of the same fold all the way around the bellows.

The front of bellows 10 is folded around and attached to metal plate 28, by means of which the bellows may be attached to the lens board or shutter housing of the camera. The back of the bellows is also folded around a metal plate (not shown) for attachment to the camera body around the exposure opening. This will obviously result in a fold comprising three thicknesses of the bellows sheet at each corner, as indicated by the reference numeral 30 in FIGURE 1. The material could be trimmed at each corner to avoid this additional thickness, but there would still be a seam and the assembly process would be even more costly. It is the normal practice to fold the corners as shown in FIGURE 1 and to use a gasket between both the front and back of the bellows and the respective camera parts to which they are attached. Since the bellows of the present invention is formed by heating and molding, both the front and back surfaces which mate with camera parts may be flat without folds or seams at the corners. Thus, no gaskets are required to insure light tightness at the mating surfaces, and an additional economy is realized from use of the present invention.

Figure 3:
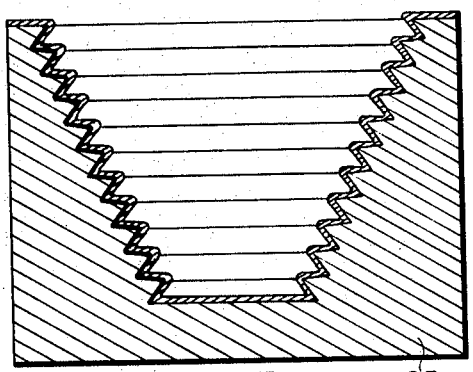
FIG. 3 is a side sectional view of a female mold for fabricating a bellows such as that shown in FIG. 2.
Figure 3A:
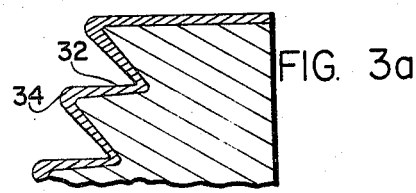
FIG. 3a is an enlarged fragment of FIG. 3.

FIG. 3 shows a cross section of a female mold 25 of proper internal shape and dimensions for molding a bellows having continuous convolutions, such as the one shown in FIG. 2. Thermoplastic materials or the like may be pressure, vacuum or blow molded, according to common and well-known techniques, to conform to the internal surface shape of the mold. Since the bellows must be completely opaque, the particular material chosen and the minimum thickness to which it is molded must be goverened accordingly. As best seen in the fragment of FIG. 3a, somewhat exaggerated for clarity of illustration, the material will tend to be thicker in the portions indicated at 32 than in those indicated at 34. This is the natural thickness assumed by a material of initial uniform thickness, when molded according to any of the above-mentioned methods, due to the contours of the mold.

Figure 4:
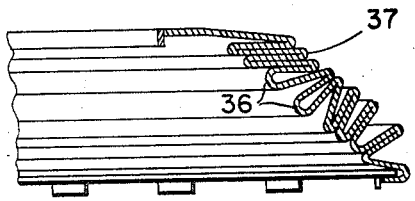
FIG. 4 is a side sectional view of a bellows showing approximately the shape it tends to assume in the folded position when molded in the mold of FIG. 3.

It may be seen that the thick portions constitute the "inside" folds of the bollows and the thin portions, the "outside" folds. FIG. 4 illustrates a bellows, molded of plastic or the like in a female mold such as that of FIG. 3, in the collapsed position. Due to the fact that the material is thicker at the inside than at the outside folds, the convolutions resist lying flat in substantially parallel planes when the bellows is collapsed. If the shutter housing, or other camera part to which the front of the bellows is attached, is retracted into proximity with the camera body, the inner convolutions, indicated by reference numeral 36, will resist folding to a greater extent than the outer convolutions 37. Consequently, the bellows assumes a shape in the collapsed position similar to that shown in FIG. 4, which is obviously undesirable and one of the reasons why molded bellows have heretofore been considered impractical.

Figure 5A:
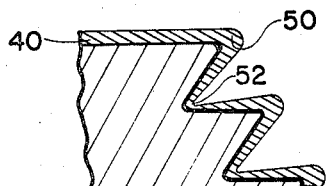
FIG. 5a is an enlarged fragment of FIG. 5.
Figure 5:
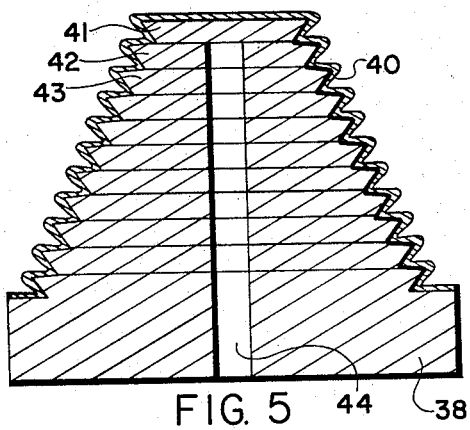
FIG. 5 is a side sectional view of a male mold for fabricating a bellows such as that shown in FIG. 2.
Figure 6:
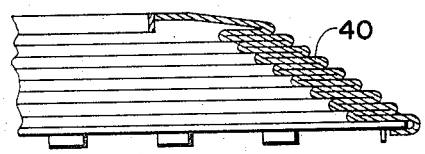
FIG. 6 is a side sectional view of a bellows showing approximately the shape it tends to assume in the folded position when molded on the mold of FIG. 5.

FIG. 5 illustrates a male mold 38, having an external shape and dimensions corresponding to the desired interior of the bellows, with a sheet of material 40 being molded thereon by pressure or vacuum. A convenient way of providing vacuum is to construct the mold sections 41, 42, 43, etc., as separate pieces which may be stacked in proper sequence and held together. Each section is provided with a central opening 44 and separated from the adjoining sections by a thin shim (.005", for example). The vacuum applied through center opening 44 will also be effective between the slightly separated sections of the mold. Here, and from the fragment shown in FIG. 5a, exaggerated as in FIG. 3a, it may be seen that material 40 is thicker at the portions indicated at 50 than at those indicated at 52. Portions 50 constitute the outside folds of the bellows when a male mold is used, and portions 52 the inside folds. This is the opposite of where the thick and thin portions lie when the bellows is molded in a female mold, as described above. Consequently, when a bellows molded on a male mold is moved to the collapsed position, each layer will lie approximately flat, as shown in FIG. 6.

One apparent difficulty of forming the bellows on a male mold is that it must be turned inside out when it is stripped from the mold, and then return to its original configuration. In order to accomplish this with relative ease, the preferred embodiment of the present invention employs a thermoplastic material of low flexural modulus. Examples of such a material are copolymers of low density polyethylene and either vinyl acetate or acrylonitrile, such as the material manufactured by the Dow Chemical Co., of Midland, Mich., under the trade name "Zetafin" and that manufactured by U.S. Industrial chemicals Co., of New York, N.Y., under the trade name "Ultrathene." These materials have a flexural modulus on the order of 6,000 p.s.i. whereas the flexural modulus of ordinary polyethylene, for example, is on the order of 15,000 p.s.i. It is thus possible to strip the bellows over the male mold without deleterious effects and to use a somewhat thicker wall, thereby obtaining better opacity, without sacrificing the necessary flexibility.

It has also been found that a uniform wall thickness on all sides of the bellows may be obtained more easily with a male mold. It is usually necessary when vacuum or pressure molding with a female mold to provide what is commonly termed a "plug assist." That is, as the material of plastic sheet is heated above the mold a plug is used to deform the material into the cavity. As the material approaches the mold walls the pressure or vacuum is applied. Unless the plug is very accurately positioned and moved with respect to the cavity, a finished piece of uneven wall thickness will obviously result. Since no plug assist is required with a male mold this problem does not arise so long as an original sheet of uniform thickness is used.

It is also important that the interior of a camera bellows have a "flat" or light absorptive finish. That is, even though the material is black, if the finish is smooth or glossy, light entering through the lens during exposure may be reflected off the interior surface of the bellows with undesirable effects on the film. The exterior surfaces of a male mold may be textured to provide a flat, non-reflective, internal surface on the finished piece.

Since the walls of the bellows are relatively thin, when a material of low flexural modulus is turned inside out in stripping over a male mold, the material may not return precisely to its original shape when turned rightside out again. That is, after the bellows has been molded, stripped and turned rightside out, it may not fold exactly on the molded creases as it is moved between the extended and folded positions. In order to overcome this, and as an additional step in the present invention, it is proposed to return the bellows to the desired shape in the folded or collapsed position and, while holding in such position, apply an additional heat treatment. The heat applied should be sufficient only to cause the bellows to "set" in the properly folded position. The bellows may then be expanded and contracted with assurance that the originally molded shape will be retained, i.e., that the bellows will fold exactly and only on the molded creases or folds.

The specific dimensions of the bellows, which of course control the dimension of the mold, depend on the size of the camera with which the bellows is to be used and the desired flexibility characteristics. Dimensions, material and process data for one specific embodiment of a bellows fabricated according to the present invention are as follows:

Dimensions:
    3⅝" x 4⅝" at rear
    1¾" x 2¾" at front
    4⅛" long as molded (can be extended to 4¼" or collapsed to ¼")
    9 continuous convolutions
    ½" radius at corners
    .008" minimum wall thickness
    maximum thickness .020" on sides, .030" front wall Material:
    (1) Ultrathene UE 630X (ethylene vinyl acetate copolymer by U.S. Industrial Chemicals), density .937, melt index 1.5, flexural modulus 5,000–7,000 p.s.i. or:
    (2) Zetafin 35 (ethylene acrylonitrile copolymer by Dow Chemical), density .952, melt index 2.5, flexural modulus 5,000–7,000 p.s.i.
    Original material thickness 1/16", black color with minimum of 3% carbon black and standard calcium carbonate additive for anti-blocking.

Process:

Material heated to 190–200° F., formed over male mold, vacuum applied and held until material is cooled to 150° F. or less, material allowed to remain on mold until approximately room temperature, stripped from mold turning bellows inside out, returned rightside out and moved to collapsed position properly folded, heated to 100–150° and held in collapsed position until returning to room temperature which may be accelerated, e.g., by chilling with cold water. It is also preferred that the mold be preheated, prior to forming the material thereon, to provide better control of the wall thickness. If this is done, cooling by air or water spray is required after forming on the mold.

From the foregoing explanation it is obvious that a camera bellows fabricated by heating and reforming a single sheet of material possesses many advantages over bellows made according to conventional present methods. Both the materials used and the manufacturing process are considerably more economical. In addition, a bellows having continuous convolutions may be fabricated without folding over or distorting the corners, thus avoiding a pileup of at least four thicknesses at each corner when in the folded position, as is the case when the outside folds on each section abut inside folds on each adjoining section, and vice versa. Also, the amount of stress at the corners is reduced, thus reducing the tendency to wear through and produce light leaks at the corners after repeated foldings.

Since certain changes may made in the above method and apparatus without departing from the scope of the invention herein involved, it is intended that all matter contained in the above description or shown in the accompanying drawing shall be interpreted as illustrative and not in a limiting sense.

We claim:

1. An expansible and collapsible bellows for use on a photographic camera or the like, said bellows comprising a continuous sheet of thermoplastic material defining four walls joined together to have a substantially rectangular cross section, said walls converging from one end of the bellows toward the other end, whereby said bellows has a generally pyramidal shape in the expanded position, each of said walls being folded alternately toward and away from the major axis of the bellows and along lines substantially at right angles thereto, whereby each successive fold is in the opposite direction of the immediately preceding fold and the thickness of each of said four walls is greater at each alternate fold wherein the material of the bellows is folded toward the bellows axis than at each fold wherein the material is folded away from said axis.

2. The invention according to claim 1 wherein the bellows includes substantially parallel external front and rear surfaces in planes normal to the axis of the bellows, each of said surfaces being continuous, free from seams and folds, whereby said surfaces may be mated directly with camera parts in lighttight engagement.

3. The invention according to claim 2 wherein said thermoplastic material has a flexural modulus on the order of 6000 p.s.i.

4. The invention according to claim 3 wherein said thermoplastic material comprises a copolymer of low density polyethylene and vinyl acetate.

5. The invention according to claim 3 wherein said thermoplastic material comprises a copolymer of low density polyethylene and acrylonitrile.

6. An expansible and collapsible bellows for use on a photographic camera or the like, said bellows comprising a continuous sheet of thermoplastic material formed in a series of convolutions and defining four walls joined together to have a substantially rectangular cross section, said walls converging from one end of the bellows toward the other end, whereby said bellows has generally pyramidal shape in the expanded position, each of said walls being folded alternately toward and away from the major axis of the bellows along lines substantially at right angles thereto, whereby each successive fold is in the opposite direction of the immediately preceding fold and each fold runs continuously around all four of said walls, the thickness of each of said four walls being greater at each alternate fold wherein the material of the bellows is folded toward the bellows axis than at each fold wherein the material is folded away from said axis, the bellows thus comprising a succession of continuous convolutions and being expansible and collapsible along said folds.

7. The invention according to claim 6 wherein the bellows includes substantially parallel external front and rear surfaces in planes normal to the axis of the bellows, each of said surfaces being continuous, free from seams and folds, whereby said surfaces may be mated directly with camera parts in lighttight engagement.

8. The invention according to claim 6 wherein said thermoplastic material has a flexural modulus on the order of 6000 p.s.i.

9. The invention according to claim 8 wherein said thermoplastic material comprises a copolymer of low density polyethylene and vinyl acetate.

10. The invention according to claim 8 wherein said thermoplastic material comprises a copolymer of low density polyethylene and acrylonitrile.

References Cited

UNITED STATES PATENTS 2,880,902   4/1959   Owsen _____ 95—39 X

JOHN M. HORAN, *Primary Examiner.*